(12) United States Patent
Pahlke et al.

(10) Patent No.: US 10,954,105 B1
(45) Date of Patent: Mar. 23, 2021

(54) SENSOR FUSION ON INTERNET OF THINGS ON ESCALATORS

(71) Applicant: Otis Elevator Company, Farmington, CT (US)

(72) Inventors: Derk Oscar Pahlke, Berlin (DE); Philipp Schedl, Vienna (AT); Robert Takacs, Sankt Poelten (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/684,857

(22) Filed: Nov. 15, 2019

(51) Int. Cl.
| | |
|---|---|
| *B66B 25/00* | (2006.01) |
| *B66B 27/00* | (2006.01) |
| *H04W 88/16* | (2009.01) |
| *B66B 23/24* | (2006.01) |
| *H04W 84/12* | (2009.01) |
| *B66B 21/08* | (2006.01) |
| *G06F 9/54* | (2006.01) |
| *G06Q 10/00* | (2012.01) |
| *H04W 4/80* | (2018.01) |

(52) U.S. Cl.
CPC ............ *B66B 25/006* (2013.01); *B66B 21/08* (2013.01); *B66B 23/24* (2013.01); *B66B 25/003* (2013.01); *B66B 27/00* (2013.01); *G06F 9/54* (2013.01); *G06Q 10/20* (2013.01); *H04W 84/12* (2013.01); *H04W 88/16* (2013.01); *H04W 4/80* (2018.02)

(58) Field of Classification Search
CPC ..... B66B 25/006; B66B 25/003; B66B 27/00; G06Q 10/20; H04W 84/12; H04W 88/16; H04W 4/80
See application file for complete search history.

(56) References Cited

U.S. PATENT DOCUMENTS

| | | | |
|---|---|---|---|
| 10,827,238 B2 * | 11/2020 | Witczak | B66B 1/3461 |
| 2020/0189879 A1 * | 6/2020 | Gentile | B66B 1/3423 |
| 2020/0207578 A1 * | 7/2020 | Liaskas | B66B 5/0025 |

* cited by examiner

*Primary Examiner* — Gene O Crawford
*Assistant Examiner* — Lester Rushin, III
(74) *Attorney, Agent, or Firm* — Cantor Colburn LLP (57) ABSTRACT

A monitoring system for an escalator including: a local gateway device; an analytic engine in communication with the local gateway device through a cloud computing network; a passenger detection engine in communication with the analytic engine through a cloud computing network, the passenger detection engine being configured to determine passenger data of the escalator; and a sensing apparatus in wireless communication with the local gateway device through a short-range wireless protocol, the sensing apparatus including: an inertial measurement unit sensor configured to detect acceleration data of the escalator, wherein at least one of the sensing apparatus, the local gateway device, and the analytic engine is configured to determine a condition based monitoring (CBM) health Score of the escalator in response to at least the acceleration data, wherein the analytic engine is configured to adjust the CBM health score in response to at least the passenger data.

20 Claims, 3 Drawing Sheets

SENSOR FUSION ON INTERNET OF THINGS ON ESCALATORS

BACKGROUND

The embodiments herein relate to the field of conveyance systems, and specifically to a method and apparatus for monitoring a conveyance apparatus of a conveyance system.

A health of a conveyance apparatus within a conveyance systems, such as, for example, elevator systems, escalator systems, and moving walkways may be difficult and/or costly to determine.

BRIEF SUMMARY

According to an embodiment, a monitoring system for an escalator is provided. The monitoring system including: a local gateway device; an analytic engine in communication with the local gateway device through a cloud computing network; a passenger detection engine in communication with the analytic engine through a cloud computing network, the passenger detection engine being configured to determine passenger data of the escalator; and a sensing apparatus in wireless communication with the local gateway device through a short-range wireless protocol, the sensing apparatus including: an inertial measurement unit sensor configured to detect acceleration data of the escalator, wherein at least one of the sensing apparatus, the local gateway device, and the analytic engine is configured to determine a condition based monitoring (CBM) health Score of the escalator in response to at least the acceleration data, wherein the analytic engine is configured to adjust the CBM health score in response to at least the passenger data.

In addition to one or more of the features described herein, or as an alternative, further embodiments may include a microphone configured to detect sound data of the escalator, wherein the CBM health score is determined in response to at least one of the acceleration data and the sound data.

In addition to one or more of the features described herein, or as an alternative, further embodiments may include that the analytic engine is configured to adjust a maintenance schedule of the escalator in response to the passenger data.

In addition to one or more of the features described herein, or as an alternative, further embodiments may include that the passenger detection engine includes at least one of a camera, a light curtain, a load sensor, and an online database.

In addition to one or more of the features described herein, or as an alternative, further embodiments may include that the sensing apparatus is configured to determine the CBM health Score of the escalator in response to at least one of the acceleration data and the sound data.

In addition to one or more of the features described herein, or as an alternative, further embodiments may include that the sensing apparatus is configured to transmit the acceleration data and the sound data to the local gateway device and the local gateway device is configured to determine the CBM health Score of the escalator in response to at least one of the acceleration data and the sound data.

In addition to one or more of the features described herein, or as an alternative, further embodiments may include that the sensing apparatus is configured to transmit the acceleration data and the sound data to the analytic engine through the local gateway device and the cloud computing network, and wherein the analytic engine is configured to determine the CBM health Score of the escalator in response to at least one of the acceleration data and the sound data.

In addition to one or more of the features described herein, or as an alternative, further embodiments may include that the sensing apparatus is located within a handrail of the escalator and moves with the handrail.

In addition to one or more of the features described herein, or as an alternative, further embodiments may include that the sensing apparatus is attached to a step chain of the escalator and moves with the step chain.

In addition to one or more of the features described herein, or as an alternative, further embodiments may include that the sensing apparatus is stationary and located proximate to a step chain of the escalator or a drive machine of the escalator.

In addition to one or more of the features described herein, or as an alternative, further embodiments may include that the sensing apparatus is attached to a moving component of a drive machine of the escalator.

In addition to one or more of the features described herein, or as an alternative, further embodiments may include that the moving component of the drive machine is an output sheave that drives a step chain of the escalator.

In addition to one or more of the features described herein, or as an alternative, further embodiments may include that the sensing apparatus uses at least one of the inertial measurement unit sensor to detect low frequency vibrations less than 10 Hz and the microphone to detect high frequency vibrations greater than 10 Hz.

According to another embodiment, a monitoring system for an escalator is provided. The monitoring system including: a local gateway device; an analytic engine in communication with the local gateway device through a cloud computing network; a weather data source in communication with the analytic engine through the cloud computing network, the weather data source being configured to obtain weather data at a location of the escalator; and a sensing apparatus in wireless communication with the local gateway device through a short-range wireless protocol, the sensing apparatus including: an inertial measurement unit sensor configured to detect acceleration data of the escalator, wherein at least one of the sensing apparatus, the local gateway device, and the analytic engine is configured to determine a condition based monitoring (CBM) health Score of the escalator in response to at least the acceleration data, wherein the analytic engine is configured to adjust the CBM health score in response to at least the weather data.

In addition to one or more of the features described herein, or as an alternative, further embodiments may include: a microphone configured to detect sound data of the escalator, wherein the CBM health score is determined in response to at least one of the acceleration data and the sound data.

In addition to one or more of the features described herein, or as an alternative, further embodiments may include that the analytic engine is configured to adjust a maintenance schedule of the escalator in response to the weather data.

In addition to one or more of the features described herein, or as an alternative, further embodiments may include that the sensing apparatus is configured to determine the CBM health Score of the escalator in response to at least one of the acceleration data and the sound data.

In addition to one or more of the features described herein, or as an alternative, further embodiments may include that the sensing apparatus is configured to transmit the acceleration data and the sound data to the local gateway device and the local gateway device is configured to determine the CBM health Score of the escalator in response to at least one of the acceleration data and the sound data.

In addition to one or more of the features described herein, or as an alternative, further embodiments may include that the sensing apparatus is configured to transmit the acceleration data and the sound data to the analytic engine through the local gateway device and the cloud computing network, and wherein the analytic engine is configured to determine the CBM health Score of the escalator in response to at least one of the acceleration data and the sound data.

According to another embodiment, a method of monitoring an escalator is provided. The method including: detecting acceleration data of the escalator using an inertial measurement unit sensor located in a sensing apparatus; determining a condition based monitoring (CBM) health Score of the escalator in response to at least the acceleration data; obtaining weather data at a location of the escalator; detecting passenger data of the escalator; and adjusting the CBM health score in response to at least one of the weather data and the passenger data.

Technical effects of embodiments of the present disclosure include monitoring a health of an escalator system using at least one of acceleration data, weather data and passenger data.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
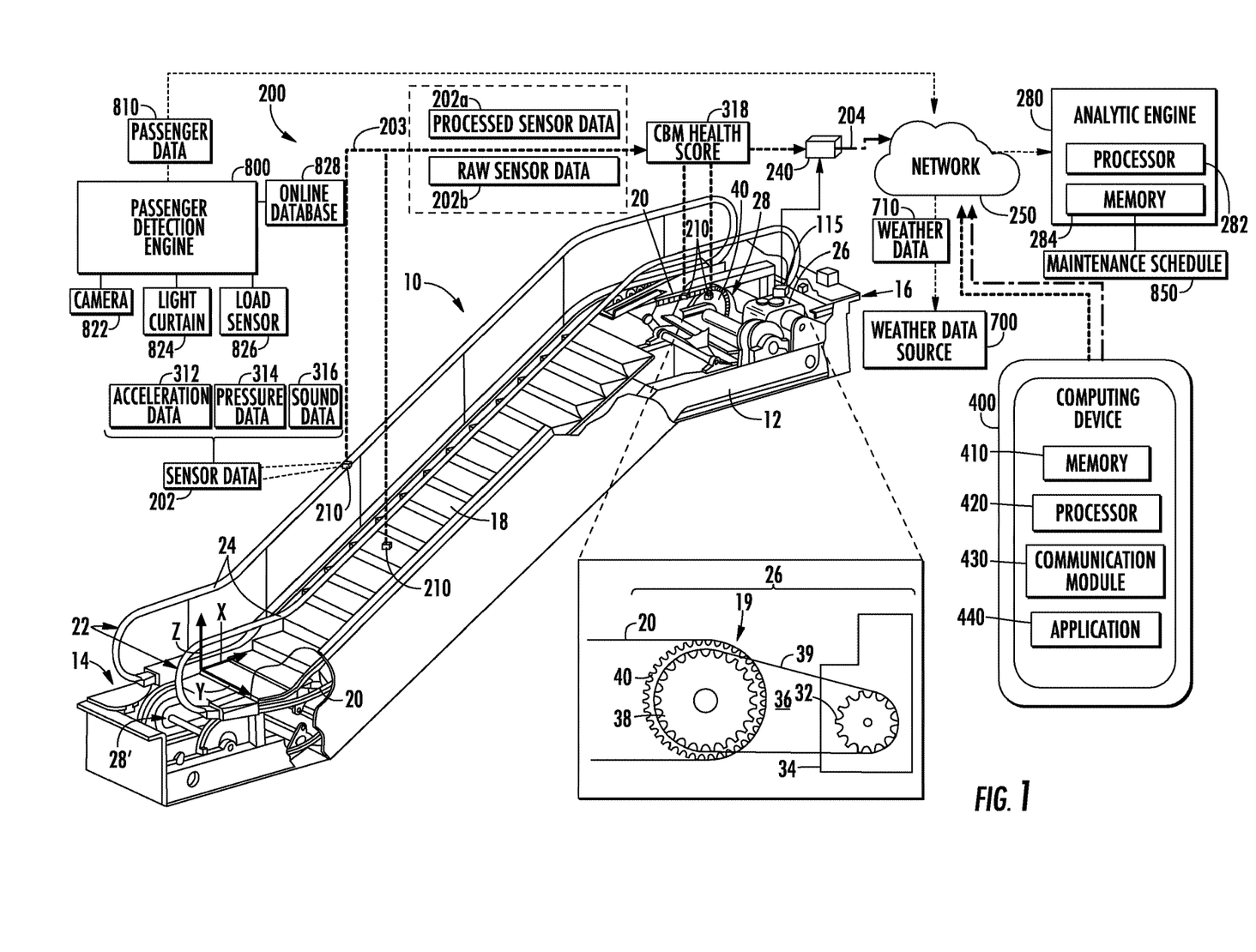
FIG. 1 is a schematic illustration of an escalator system and a monitoring system, in accordance with an embodiment of the disclosure.

FIG. 1 illustrates an escalator 10. It should become apparent in the ensuing description that the invention is applicable to other passenger conveyor systems, such as moving walks. The escalator 10 generally includes a truss 12 extending between a lower landing 14 and an upper landing 16. A plurality of sequentially connected steps or tread plates 18 are connected to a step chain 20 and travel through a closed loop path within the truss 12. A pair of balustrades 22 includes moving handrails 24. A drive machine 26, or drive system, is typically located in a machine space 28 under the upper landing 16; however, an additional machine space 28' can be located under the lower landing 14. The drive machine 26 is configured to drive the tread plates 18 and/or handrails 24 through the step chain 20. The drive machine 26 operates to move the tread plates 18 in a chosen direction at a desired speed under normal operating conditions.

The tread plates 18 make a 180 degree heading change in a turn-around area 19 located under the lower landing 14 and upper landing 16. The tread plates 18 are pivotally attached to the step chain 20 and follow a closed loop path of the step chain 20, running from one landing to the other, and back again.

The drive machine 26 includes a first drive member 32, such as motor output sheave, connected to a drive motor 34 through a belt reduction assembly 36 including a second drive member 38, such as an output sheave, driven by a tension member 39, such as an output belt. The first drive member 32 in some embodiments is a driving member, and the second drive member 38 is a driven member.

As used herein, the first drive member 32 and/or the second drive member, in various embodiments, may be any type of rotational device, such as a sheave, pulley, gear, wheel, sprocket, cog, pinion, etc. The tension member 39, in various embodiments, can be configured as a chain, belt, cable, ribbon, band, strip, or any other similar device that operatively connects two elements to provide a driving force from one element to another. For example, the tension member 39 may be any type of interconnecting member that extends between and operatively connects the first drive member 32 and a second drive member 38. In some embodiments, as shown in FIG. 1, the first drive member 32 and the second drive member may provide a belt reduction. For example, first drive member 32 may be approximately 75 mm (2.95 inches) in diameter while the second drive member 38 may be approximately 750 mm (29.53 inches) in diameter. The belt reduction, for example, allows the replacement of sheaves to change the speed for 50 or 60 Hz electrical supply power applications, or different step speeds. However, in other embodiments the second drive member 38 may be substantially similar to the first drive member 32.

As noted, the first drive member 32 is driven by drive motor 34 and thus is configured to drive the tension member 39 and the second drive member 38. In some embodiments the second drive member 38 may be an idle gear or similar device that is driven by the operative connection between the first drive member 32 and the second drive member 38 by means of tension member 39. The tension member 39 travels around a loop set by the first drive member 32 and the second drive member 38, which herein after may be referred to as a small loop. The small loop is provided for driving a larger loop which consists of the step chain 20, and is driven by an output sheave 40, for example. Under normal operating conditions, the tension member 39 and the step chain 20 move in unison, based upon the speed of movement of the first drive member 32 as driven by the drive motor 34.

The escalator 10 also includes a controller 115 that is in electronic communication with the drive motor 34. The controller 115 may be located, as shown, in the machine space 28 of the escalator 10 and is configured to control the operation of the escalator 10. For example, the controller 115 may provide drive signals to the drive motor 34 to control the acceleration, deceleration, stopping, etc. of the tread plates 18 through the step chain 20. The controller 115 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

Although described herein as a particular escalator drive system and particular components, this is merely exemplary, and those of skill in the art will appreciate that other escalator system configurations may operate with the invention disclosed herein.

The elements and components of escalator 10 may suffer from fatigue, wear and tear, or other damage such that diminish health of the escalator 10. The embodiments disclosed herein seek to provide a monitoring system 200 for the escalator 10 of FIG. 1.

A monitoring system 200 is illustrated in FIG. 1, according to an embodiment of the present disclosure. The monitoring system 200 includes one or more sensing apparatus 210 configured to detect sensor data 202 of the escalator 10, process the sensor data 202, and transmit the processed sensor data 202a (e.g., a condition based monitoring (CBM) health score 318) to a cloud connected analytic engine 280. Alternatively, the sensor data 202 may be sent raw to at least one of a local gateway device 240 and an analytic engine 280, where the raw sensor data 202b will be processed. The processed sensor data 202a may simply be the CBM heath score 318. Based on the type of sensor data 202 being collected by the sensing apparatus 210, the analytical engine 280 is able to select, through the network 250, how the sensors data 202 from different sensing apparatuses 210 is cooperating with each other.

The raw sensor data 202b and/or the processed sensor data 202a may be transmitted in data packages 207 between the local gateway device 240 and the network 250. The data packages 207 may be transmitted using secure internet protocols (e.g., UDP, TCP) with payload and messaging encryption (e.g., AES 256). The data packages 207 may be transmitted in an efficient manor at a selected frequency. For example, the data packages 207 may be transmitted every 2 minutes to establish an uninterrupted connection using a dynamic IP address or a static IP address. The data packages 207 may be transmitted using data compression (e.g., MQTT) to have to have bi-directional communication with network 250. Information such as, for example, heart beat data, remote (intervention) commands, Over the air updates to firmware may be communicated. Heartbeat data may include information regarding the status of the escalator 10. Intervention commands may include commands that can be sent to the device to change operation of the device. In embodiment, the data compression is MQTT data compression. The compression of the sensor data 202 does not affect the way the sensor data 202 interacts with other sensor data 202. The process sensor data 202a and the raw sensors data 202b may be available via the network 250.

Sensor data 202 may include but is not limited to pressure data 314, vibratory signatures (i.e., vibrations over a period of time) or acceleration data 312, and sound data 316. The acceleration data 312 may derivatives or integrals of acceleration data 312 of the escalator 10, such as, for example, location distance, velocity, jerk, jounce, snap . . . etc. Sensor data 202 may also include light, humidity, and temperature data, or any other desired data parameter. It should be appreciated that, although particular systems are separately defined in the schematic block diagrams, each or any of the systems may be otherwise combined or separated via hardware and/or software. For example, the sensing apparatus 210 may be a single sensor or may be multiple separate sensors.

The monitoring system 200 may include one or more sensing apparatus 210 located in various locations of the escalator 10. In one example, a sensing apparatus 210 may be located attached to or within the handrails 24 and move with the handrails 24. In another example, a sensing apparatus 210 is stationary and is located proximate the drive machine 26 or step chain 20. In another example, a sensing apparatus 210 may be attached to the step chain 20 and moving with the moving step chain 20. In another example, a sensing apparatus 210 may be attached to the tread plate 18 and moving with the tread plate 18. In another example, a sensing apparatus 210 may be attached to the drive machine 26 and moving relative to the moving step chain 20. In another embodiment, the sensing apparatus 210 may be attached to a moving component of the drive machine 26. The moving component of the drive machine 26 may be output sheave 40 that drives a step chain 20 of the escalator 10. The cloud computing network 250 makes it possible that the sensing apparatuses 210 are automatically selected based on the desired outcome displayed on the computing device 400. This may avoid having the same sensing apparatus 210 in all escalators 10. Thus, the algorithms in cloud computing network 250 may be able to cooperate in such a way that the processed sensor data 202a or the raw sensor data 202b from the sensing apparatus 210 which are available, create a selected outcome or give a "not available message" back. For example, acceleration data 312 (i.e., vibration data) and sound data 316 may cooperate in such a way that faults are only displayed on the computing device if multiple sensing apparatus 210 find a fault. In the event of missing sensor data 202 (e.g., vibration/acceleration data 312) a "not available message" will be sent.

In an embodiment, the sensing apparatus 210 is configured to process the sensor data 202 prior to transmitting the sensor data 202 to the analytic engine 280 through a processing method, such as, for example, edge processing. Advantageously, utilizing edge processing helps save energy by reducing the amount of data that needs to be transferred. In another embodiment, the sensing apparatus 210 is configured to transmit the raw sensor data 202b that is raw and unprocessed to an analytic engine 280 for processing.

The processing of the sensor data 202 may reveal data, such as, for example, vibrations, vibratory signatures, sounds, temperatures, acceleration of the escalator 10, deceleration of the escalator, escalator ride performance, emergency stops, etc.

The analytic engine 280 may be a computing device, such as, for example, a desktop, a cloud based computer, and/or a cloud based artificial intelligence (AI) computing system. The analytic engine 280 may also be a computing device that is typically carried by a person, such as, for example a smartphone, PDA, smartwatch, tablet, laptop, etc. The analytic engine 280 may also be two separate devices that are synced together, such as, for example, a cellular phone and a desktop computer synced over an internet connection.

The analytic engine 280 may be an electronic controller including a processor 282 and an associated memory 284 comprising computer-executable instructions that, when executed by the processor 282, cause the processor 282 to perform various operations. The processor 282 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 284 may be but is not limited to a random access memory (RAM), read only memory (ROM), or other electronic, optical, magnetic or any other computer readable medium.

The sensing apparatus 210 is configured to transmit the raw sensor data 202b or processed sensor data 202a to a local gateway device 240 via short-range wireless protocols 203. Short-range wireless protocols 203 may include but are not limited to Bluetooth, BLE, Wi-Fi, LoRa, insignu, enOcean, Sigfox, HaLow (801.11ah), zWave, ZigBee, Wireless M-Bus or other short-range wireless protocol known to one of skill in the art. In an embodiment, the local gateway device 240 may utilize message queuing telemetry transport (MQTT or MQTT SN) to communicate with the sensing apparatus 210. Advantageously, MQTT minimizes network bandwidth and device resource requirements, which helps reduce power consumption amongst the local gateway device 240 and the sensing apparatus 210, while helping to ensure reliability and message delivery. Using short-range wireless protocols 203, the sensing apparatus 210 is configured to transmit the sensor data 202 that is raw or processed directly the local gateway device 240 and the local gateway device 240 is configured to transmit the sensor data 202 that is raw or processed to the analytic engine 280 through a network 250 or to the controller 115. The network 250 may be a computing network, such as, for example, a cloud computing network, cellular network, or any other computing network known to one of skill in the art. Using long-range wireless protocols 204, the sensing apparatus 210 is configured to transmit the sensor data 202 to the analytic engine 280 through a network 250. Long-range wireless protocols 204 may include but are not limited to cellular, 3G, 4G, 5G, Cat M1, weightless, LTE (NB-IoT, CAT M1), LoRa, Satellite, Ingenu, or SigFox. The local gateway device 240 may be in communication with the controller 115 through a hardwired and/or wireless connection using short-range wireless protocols 203.

The sensing apparatus 210 may be configured to detect sensor data 202 including acceleration in any number of directions. In an embodiment, the sensing apparatus 210 may detect sensor data 202 including acceleration data 312 along three axis, an X axis, a Y axis, and a Z axis. As illustrated in FIG. 1, the X axis and Y axis may form a plane parallel to the tread plate 18 and the Z axis are perpendicular to the tread plate 18. The Z axis is parallel to the vertical direction or direction of gravity. The X is parallel to the horizontal movement of the tread plates 18, whereas the Y axis is perpendicular to the horizontal movement of the tread plates 18.

Also shown in FIG. 1 is a computing device 400. The computing device 400 may belong to an escalator mechanic/technician working on or monitoring the escalator 10. The computing device 400 may be a computing device such as a desktop computer or a mobile computing device that is typically carried by a person, such as, for example a smart phone, PDA, smart watch, tablet, laptop, etc. The computing device 400 may include a display device so that the mechanic may visually see a CBM health score 318 of the escalator 10 or sensor data 202. The computing device 400 may include a processor 420, memory 410, a communication module 430, and an application 440, as shown in FIG. 1. The processor 420 can be any type or combination of computer processors, such as a microprocessor, microcontroller, digital signal processor, application specific integrated circuit, programmable logic device, and/or field programmable gate array. The memory 410 is an example of a non-transitory computer readable storage medium tangibly embodied in the computing device 400 including executable instructions stored therein, for instance, as firmware. The communication module 430 may implement one or more communication protocols, such as, for example, short-range wireless protocols 203 and long-range wireless protocols 204. The communication module 430 may be in communication with at least one of the controller 115, the sensing apparatus 210, the network 250, and the analytic engine 280. In an embodiment, the communication module 430 may be in communication with the analytic engine 280 through the network 250.

The communication module 430 is configured to receive a CBM health score 318 and/or sensor data 202 from the network 250, and the analytic engine 280. The application 440 is configured to generate a graphical user interface on the computing device 400 to display the CBM health score 318. The application 440 may be computer software installed directly on the memory 410 of the computing device 400 and/or installed remotely and accessible through the computing device 400 (e.g., software as a service).

Also shown in FIG. 1 is a weather data source 700 configured to provide weather data 710 to at least one of the controller 115 of the escalator 10, the analytic engine 280, and the computing device 400. The weather data source 700 may be in wireless electronic communication through the network 250 with at least one of the controller 115 of the escalator 10, the analytic engine 280, and the computing device 400. The weather data source 700 may be in wireless electronic communication with the network 250 through long-range wireless protocols 204. The weather data source may be one or more weather stations detecting weather data 710 and/or the weather data source 700 may be an online weather database, such as, for example the national weather service or European Centre for Medium-Range Weather Forecasts. Weather data 710 may include weather conditions including past, present and future weather conditions at a location of the escalator 10, such as, for example, rain, snow, sleet, temperature, wind, fog, humidity, visibility, pressure, dew point, lightning, air quality, etc. The weather data 710 may help explain why an escalator 10 is running poorly if it just snowed and dirt/gravel is getting tracked into the tread plates 18 or if rain is flooding the escalator 10 forcing the escalator 10 to shut down. The analytic engine 280 is configured to adjust the CBM health score 318 based upon the weather data 710.

Additionally, the analytic engine 280 may be configured to command the controller 155 of the escalator 10 to adjust operation of the escalator 10 in response to the weather data 710. For example, if flooding is predicted to occur in the location of an escalator 10 according to the weather data 710 then the escalator 10 may be shut down in advance of the flooding to protect the escalator 10.

Also shown in FIG. 1 is a passenger detection engine 800 configured to passenger data 810 to at least one of the controller 115 of the escalator 10, the analytic engine 280, and the computing device 400. Passenger data 810 may include an approximate number of passengers that are currently riding the escalator or an approximate number of passengers that will be riding the escalator in the future. The passenger detection engine 800 may be in wireless electronic communication through the network 250 with at least one of the controller 115 of the escalator 10, the analytic engine 280, and the computing device 400. The passenger detection engine 800 may be in wireless electronic communication with the network 250 through long-range wireless protocols 204. The passenger detection engine 800 may be a camera 822, a light curtain 824, a load sensor 826 at the floor plate at the upper landing 16 or the lower landing 14, and/or an online database 828.

The camera 822 may be a video camera that utilizes image recognition for people counting (e.g., a neural network), a 2D camera, a 3D camera, a thermal camera, an infrared camera, or similar camera known to one of skill in the art. The camera 822 may be located proximate the escalator 10 or in an area away from the escalator 10. For example, the camera 822 may be located at the exit of a train or sports arena where a substantial number of individuals exiting may be expected to use the escalator 10. The online database 828 may be an online calendar that may indicate when passengers may be using the escalator 10. The online calendar may be an online calendar of a train or sports arena that may indicate when individuals may be exiting the train or sports arena and using the escalator 10. When this passenger data 810 is reported to the analytic engine 280 the analytic engine 280 could better predict future use of the escalator 10 that may affect operation of escalator 10 and a maintenance schedule 850 of the escalator 10. The maintenance schedule 850 may be a schedule of planned maintenance for the escalator 10 and may be stored in the memory 284 of the analytic engine 280.

The light curtain 824 may be a human detection device that projects a beam of light and detects when the beam of light is crossed by an individual in order to count the number of individuals crossing the beam of light. The light curtain 824 may be located proximate the escalator 10 (e.g., by the entrance of the escalator 10 at lower landing 14 or an upper landing 16) or in an area away from the escalator 10. For example, the light curtain 824 may be located at the exit of a train or sports arena where a substantial number of individuals exiting may be expected to use the escalator 10. When this passenger data 810 is reported to the analytic engine 280 the analytic engine 280 could better predict future use of the escalator 10 that may affect operation and the maintenance schedule 850. For example, if one of the online databases 828, light curtain 824, and camera 822 detects that a sports event at a sports arena is just ending, then the analytic engine 280 may instruct the controller 115 of the escalator 10 to adjust the direction of movement of the tread plates 18 to ensure passengers are moved away from the sports area.

The load sensor 826 may be a separate load sensors that measures the loads on a floor plate proximate the lower landing 14 or the upper landing 16 in order to determined how many passengers are boarding the escalator 10. Alternatively, the load sensors 826 may determine the load on the tread plate using the controller 115 of the escalator 10. For example, a load on the tread plate 18 may be determined by detecting a change in load on the drive machine 26. The change in load on the drive machine 26 can be correlated to the change in load on the tread plate 18.

The load on the drive machine 26 may be determined by detecting a change in the grid current required by the drive machine 26 to operate the escalator at a specified speed. An increase in the load on the tread plates 18 would require the drive machine 26 to work harder to move the tread plates 18, thus the current from a grid source to the drive machine 26 would increase. The increase in current may be proportional to the number of passengers utilizing the escalator 10 and thus the number of passengers may be determined from the increase in current.

Additionally, the load on the drive machine 26 may be determined by placing a strain gage on a bearing of the second drive member 38 and by measuring the displacement of the strain gauge, the load of the escalator can be verified.

Detection of passenger data 810 depicting passenger usage of the escalator 10 may affect wear and aging of the escalator 10 and individual components of the escalator 10. Thus, the analytic engine 280 may be configured to adjust the maintenance schedule 350 of the escalator 10 in response to passenger data 810. For example, if the escalator 10 is being utilized at an above average rate by more passengers than usual then the scheduled maintenance may need to be performed more often than usual. In one example, the CBM health score 318 may be adjusted in response to the passenger data 810, which then adjusts the maintenance schedule 850.

Additionally, detection of weather data 710 depicting the operating conditions of the escalator 10 may affect wear and aging of the escalator 10 and individual components of the escalator 10. Thus, the analytic engine 280 may be configured to adjust maintenance schedule 350 of the escalator 10 in response to weather data 710. For example, if the escalator 10 is being utilized at an above average temperature than usual then the scheduled maintenance may need to be performed more often than usual because the increase in temperature may affect machine oil performance within the escalator 10. In one example, the CBM health score 318 may be adjusted in response to the weather data 710, which then adjusts the maintenance schedule 850.

Figure 2:
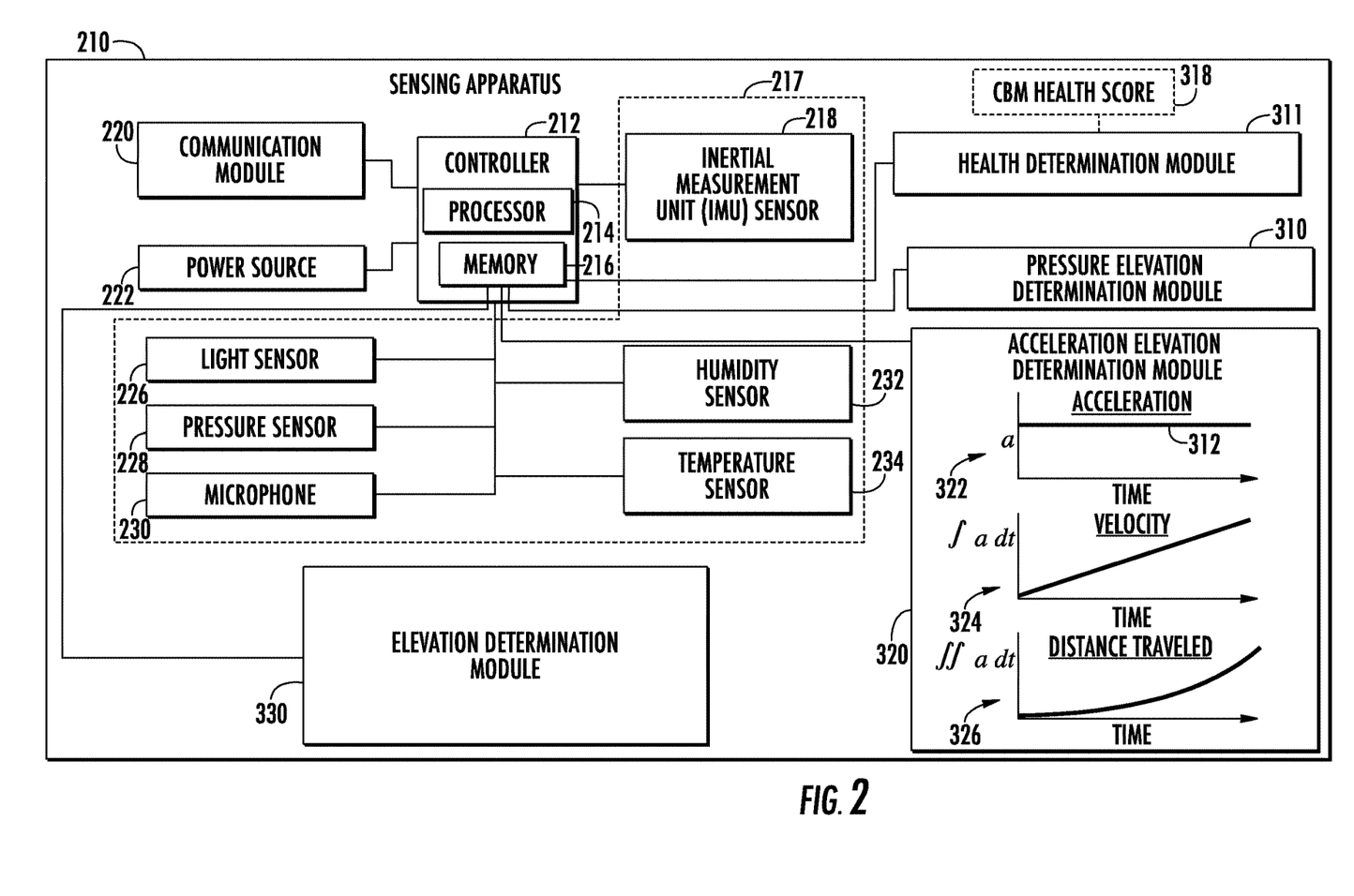
FIG. 2 is a schematic illustration of a sensing apparatus of the monitoring system of FIG. 1, in accordance with an embodiment of the disclosure.

FIG. 2 illustrates a block diagram of the sensing apparatus 210 of the monitoring system 200 of FIG. 1. It should be appreciated that, although particular systems are separately defined in the schematic block diagram of FIG. 2, each or any of the systems may be otherwise combined or separated via hardware and/or software. As shown in FIG. 2, the sensing apparatus 210 may include a controller 212, a plurality of sensors 217 in communication with the controller 212, a communication module 220 in communication with the controller 212, and a power source 222 electrically connected to the controller 212.

The plurality of sensors 217 includes an inertial measurement unit (IMU) sensor 218 configured to detect sensor data 202 including acceleration data 312 of the sensing apparatus 210 and the escalator 10. The IMU sensor 218 may be a sensor, such as, for example, an accelerometer, a gyroscope, or a similar sensor known to one of skill in the art. The acceleration data 312 detected by the IMU sensor 218 may include accelerations as well as derivatives or integrals of accelerations, such as, for example, velocity, jerk, jounce, snap . . . etc. The IMU sensor 218 is in communication with the controller 212 of the sensing apparatus 210.

The plurality of sensors 217 includes a pressure sensor 228 configured to detect sensor data 202 including pressure data 314, such as, for example, atmospheric air pressure proximate the escalator 10. The pressure sensor 228 may be a pressure altimeter or barometric altimeter in two non-limiting examples. The pressure sensor 228 is in communication with the controller 212.

The plurality of sensors 217 includes a microphone 230 configured to detect sensor data 202 including sound data 316, such as, for example audible sound and sound levels. The microphone 230 may be a 2D (e.g., stereo) or 3D microphone. The microphone 230 is in communication with the controller 212.

The plurality of sensors 217 may also include additional sensors including but not limited to a light sensor 226, a pressure sensor 228, a humidity sensor 232, and a temperature sensor 234. The light sensor 226 is configured to detect sensor data 202 including light exposure. The light sensor 226 is in communication with the controller 212. The humidity sensor 232 is configured to detect sensor data 202 including humidity levels. The humidity sensor 232 is in communication with the controller 212. The temperature sensor 234 is configured to detect sensor data 202 including temperature levels. The temperature sensor 234 is in communication with the controller 212.

The plurality of sensors 217 of the sensing apparatus 210 may be utilized to determine various operating modes of the escalator 10. Any one of the plurality of sensors 217 may be utilized to determine that the escalator 10 is running. For example, the microphone 230 may detect a characteristic noise indicating that the escalator 10 is running or the IMU sensor 218 may detect a characteristic acceleration indicating that the escalator 10 is running. The pressure sensor 228 may be utilized to determine a running speed of the escalator 10. For example, if the sensing apparatus 210 is located on the step chain 20 or the tread plate 18, a continuous or constant air pressure change may indicate movement of the step chain 20 and thus the running speed may be determined in response to the change in air pressure. The IMU sensor 218 may be utilized to determine a height of the escalator 10. For example, if the sensing apparatus 210 is located on the handrail 24 or the tread plate 18, a change in direction of velocity (e.g., step is moving up and then suddenly moving down) may indicate that the handrail 24 or tread plate 18 has reached a maximum height. The IMU sensor 218 may be utilized to determine a braking distance of the escalator 10. For example, if the sensing apparatus 210 is located on the handrail 24, the step chain 20, or the tread plate 18, the second integral of deceleration of the sensing apparatus 210 may be calculated to determine braking distance. Braking distance may be determined from acceleration data 312 indicating an acceleration above threshold to a first zero-crossing of filtered sensor data (integrated speed from measured vibration of the acceleration data 312). The IMU sensor 218 may be utilized to determine an occupancy state of the escalator 10. For example, if the sensing apparatus 210 is located on the step chain 20 or the tread plate 18, vibrations detected by the sensing apparatus 210 using the IMU sensor 218 may indicate entry of passengers onto the escalator 10 or exit of passengers off the escalator 10.

The controller 212 of the sensing apparatus 210 includes a processor 214 and an associated memory 216 comprising computer-executable instructions that, when executed by the processor 214, cause the processor 214 to perform various operations, such as, for example, edge pre-processing or processing the sensor data 202 collected by the IMU sensor 218, the light sensor 226, the pressure sensor 228, the microphone 230, the humidity sensor 232, and the temperature sensor 234. In an embodiment, the controller 212 may process the acceleration data 312 and/or the pressure data 314 in order to determine an elevation of the sensing apparatus 210 if the sensing apparatus 210 is on a component that rises or falls during operation of the escalator 10, such as, for example, on the handrail 24 and step chain 20. In an embodiment the controller 212 of the sensing apparatus 210 may utilize a Fast Fourier Transform (FFT) algorithm to process the sensor data 202.

The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and/or supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art. The power source 222 may also be a hardwired power supply that is hardwired to and receives electricity from an electrical grid and/or the escalator 10.

The sensing apparatus 210 includes a communication module 220 configured to allow the controller 212 of the sensing apparatus 210 to communicate with the local gateway device 240 through short-range wireless protocols 203. The communication module 220 may be configured to communicate with the local gateway device 240 using short-range wireless protocols 203, such as, for example, Bluetooth, BLE, Wi-Fi, LoRa, insignu, enOcean, Sigfox, HaLow (801.11ah), zWave, ZigBee, Wireless M-Bus or other short-range wireless protocol known to one of skill in the art. Using short-range wireless protocols 203, the communication module 220 is configured to transmit the sensor data 202 to a local gateway device 240 and the local gateway device 240 is configured to transmit the sensor data 202 to an analytic engine 280 through a network 250, as described above.

The communication module 220 may also allow a sensing apparatus 210 to communicate with other sensing apparatus 210 either directly through short-range wireless protocols 203 or indirectly through the local gateway device 240 and/or the cloud computing network 250. Advantageously, this allows the sensing apparatuses 210 to coordinate detection of sensor data 202.

The sensing apparatus 210 includes an elevation determination module 330 configured to determine an elevation or (i.e., height) of a sensing apparatus 210 that is located on a moving component of the escalator 10, such as for example the tread plate 18, the step chain 20 and/or the handrail 24. The elevation determination module 330 may utilize various approaches to determine an elevation or (i.e., height) of the sensing apparatus 210. The elevation determination module 330 may be configured to determine an elevation of the sensing apparatus 210 using at least one of a pressure elevation determination module 310 and an acceleration elevation determination module 320.

The acceleration elevation determination module 320 is configured to determine a height change of the sensing apparatus in response to the acceleration of the sensing apparatus 210 detected along the Z axis. The sensing apparatus 210 may detect an acceleration along the Z axis shown at 322 and may integrate the acceleration to get a vertical velocity of the sensing apparatus at 324. At 326, the sensing apparatus 210 may also integrate the vertical velocity of the sensing apparatus 210 to determine a vertical distance traveled by the sensing apparatus 210 during the acceleration data 312 detected at 322. The direction of travel of the sensing apparatus 210 may also be determined in response to the acceleration data 312 detected. The elevation determination module 330 may then determine the elevation of the sensing apparatus 210 in response to a starting elevation and a distance traveled away from that starting elevation. The starting elevation may be based upon tracking the past operation and/or movement of the sensing apparatus 210. Unusual changes in acceleration and/or the velocity of the escalator may indicate poor CBM health score 318.

The pressure elevation determination module 310 is configured to detect an atmospheric air pressure when the sensing apparatus is in motion and/or stationary using the pressure sensor 228. The pressure detected by the pressure sensor 228 may be associated with an elevation through either a look up table or a calculation of altitude using the barometric pressure change in two non-limiting embodiments. The direction of travel of the sensing apparatus 210 may also be determined in response to the change in pressure detected via the pressure data 314. For example, the change in the pressure may indicate that the sensing apparatus 210 is either moving up or down. The pressure sensor 228 may need to periodically detect a baseline pressure to account for changes in atmospheric pressure due to local weather conditions. For example, this baseline pressure may need to be detected daily, hourly, or weekly in non-limiting embodiments. In some embodiments, the baseline pressure may be detected whenever the sensing apparatus is stationary, or at certain intervals when the sensing apparatus 210 is stationary and/or at a known elevation. The acceleration of the sensing apparatus 210 may also need to be detected to know when the sensing apparatus 210 is stationary and then when the sensing apparatus 210 is stationary the sensing apparatus 210 may need to be offset to compensate the sensor drift and environment drift.

In one embodiment, the pressure elevation determination module 310 may be used to verify and/or modify an elevation of the sensing apparatus 210 determined by the acceleration elevation determination module 320. In another embodiment, the acceleration elevation determination module 320 may be used to verify and/or modify an elevation of the sensing apparatus determined by the pressure elevation determination module 310. In another embodiment, the pressure elevation determination module 310 may be prompted to determine an elevation of the sensing apparatus 210 in response to an acceleration detected by the IMU sensor 218.

The health determination module 311 is configured to determine a CBM health score 318 of the escalator 10. The CBM health score 318 may be associated with a specific component of the escalator 10 or be a CBM health score 318 for the overall escalator 10. The health determination module 311 may be located in the analytic engine 280, local gateway device 240, or the sensing apparatus 210. In an embodiment, the health determination module 311 is located in the sensing apparatus 210 to perform the edge processing. The health determination module 311 may use a FFT algorithm to process the sensor data 202 to determine a CBM health score 318. In one embodiment, a health determination module 311 may process at least one of the sound data 316 detected by the microphone 230, the light detected by the light sensor 226, the humidity detected by the humidity sensor 232, the temperature data detected by the temperature sensor 234, the acceleration data 312 detected by the IMU sensor 218, and/or the pressure data 314 detected by the pressure sensor 228 in order to determine a CBM health score 318 of the escalator 10.

In an embodiment, the health determination module 311 may process at least one of the sound data 316 detected by the microphone 230 and the acceleration data 312 detected by the IMU sensor 218 to determine a CBM health score 318 of the escalator 10.

Different frequency ranges may be required to detect different types of vibrations in the escalator 10 and different sensors (e.g., microphone, IMU sensor 218, . . . etc.) of the sensing apparatus 210 may be better suited to detect different frequency ranges. In one example, a vibration in the handrail 24 may consist of a low frequency contribution vibration of less than 5 hz and a higher frequency vibration that is caused on the point where friction in the handrail 24 may be occurring. The low frequency vibration may be best detected using the IMU sensor 218, whereas the higher frequency vibrations (e.g., in the kHz region) may be best detected using the microphone 230 is more power efficient. Advantageously, using the microphone to detect higher frequency vibrations and the IMU sensor 218 to detect lower frequency vibrations is more energy efficient. In an embodiment, higher frequency may include frequencies that are greater than or equal to 10 Hz. In an embodiment, lower frequency may include frequencies that are less than or equal to 10 Hz.

The sensing apparatus 210 may be placed in specific locations to capture vibrations from different components. In an embodiment, the sensing apparatus 210 may be placed in the handrail 24 (i.e., moving with the handrail 24). When located in the handrail 24, the sensing apparatus 210 may utilize the IMU sensors 218 to capture low frequency vibrations. Any variance in the low frequency vibration from a baseline may indicate a low CBM health score 318. A foreign object (e.g., dirt, dust, pebbles) may get stuck in the handrail 24, thus leading to increased vibration. In one example, low frequency oscillations may appear because of dust or dirt causing friction. These low frequency oscillations may be identified using a low pass filter of less than 2 Hz. In another example, singles spikes or noise may appear by dirt sticking on tracks or wheels of the step chain 20. These single spikes or noise may be detected by identifying spikes in vibrations greater than 100 mg.

In an embodiment, the sensing apparatus 210 may be attached to (e.g., in or on) the step chain 20 or the tread plate 18 (i.e., moving with the step chain 20 or the tread plate 18). In another embodiment, the sensing apparatus 210 located stationary proximate the drive machine 26. The temperature sensor 234 may best measure temperature of the drive machine 26 when the sensing apparatus 210 is attached to the drive machine 26. The IMU sensor 218 may best measure accelerations when the sensing apparatus 210 is attached to the output sheave 40. When attached to the step chain 20 or located stationary proximate the drive machine 26, the sensing apparatus 210 may utilize the IMU sensors 218 to capture low frequency vibrations that may indicate a bearing problem with a main pivot of the step chain 20, a step roller of the step chain 20, or a handrail pivot of the handrail 24. Alternatively, when attached to the step chain 20 or located stationary proximate the drive machine 26, the sensing apparatus 210 may utilize the microphone 230 to capture high frequency vibrations that may indicate a bearing problem. A FFT algorithm may be utilized to help analyze the high frequency vibrations captures by the microphone. Advantageously, FFT algorithms use pre-defined special electronic hardware resulting in an easy, low cost, and low power consuming way to detect deviations. When attached to the step chain 20 or located stationary proximate the drive machine 26, the sensing apparatus 210 may utilize the temperature sensor 234 to measure temperatures. Increasing temperatures may be indicative of increased machine load on the drive machine 26 or increased friction. When attached to the step chain 20, the sensing apparatus 210 may utilize the IMU sensors 218 to capture accelerations in multiple axis (e.g., X axis, Y axis, and Z axis) to determine tread plate 18 direction (e.g., up or down), a 3D acceleration profile of the tread plate 18 to determine, amongst other things, when the tread plate 18 is turning, a tread plate 18 misalignment, and bumps in the step chain 20 that may be indicative of foreign objects (dirt, pebbles, dust, . . . etc.) in the step chain 20 or tread plates 18. The combination of multiple sensor information from different sensors of the plurality of sensors 217 leads to the ability of the sensor fusion within the sensing apparatus, thus allowing the sensors to work in concert to confirm, adjust, or deny data readings. For example, an increase in acceleration values within the acceleration data 312 (at certain frequencies (FFT)) may be associated with an increase in temperature detected by the temperature sensor 234 (e.g., machine heat of the drive machine 26 due to higher load) and an increase in relative humidity detected by the humidity sensor 232 (excluding variations of frictions due to external weather conditions).

The CBM health score 318 may be a graded scale indicating the health of the escalator 10 and/or components of the escalator 10. In a non-limiting example, the CBM health score 318 may be graded on a scale of one-to-ten with a CBM health score 318 equivalent to one being the lowest CBM health score 318 and a CBM health score 318 equivalent to ten being the highest CBM health score 318. In another non-limiting example, the CBM health score 318 may be graded on a scale of one-to-one-hundred percent with a CBM health score 318 equivalent to one percent being the lowest CBM health score 318 and a CBM health score 318 equivalent to one-hundred percent being the highest CBM health score 318. In another non-limiting example, the CBM health score 318 may be graded on a scale of colors with a CBM health score 318 equivalent to red being the lowest CBM health score 318 and a CBM health score 318 equivalent to green being the highest CBM health score 318. The CBM health score 318 may be determined in response to at least one of the acceleration data 312, the pressure data 314, and/or the temperature data. For example, acceleration data 312 above a threshold acceleration (e.g., normal operating acceleration) in any one of the X axis, a Y axis, and a Z axis may be indicative of a low CBM health score 318. In another example, elevated temperature data above a threshold temperature for components may be indicative of a low CBM health score 318. In another example, elevated sound data 316 above a threshold sound level for components may be indicative of a low CBM health score 318.

Figure 3:
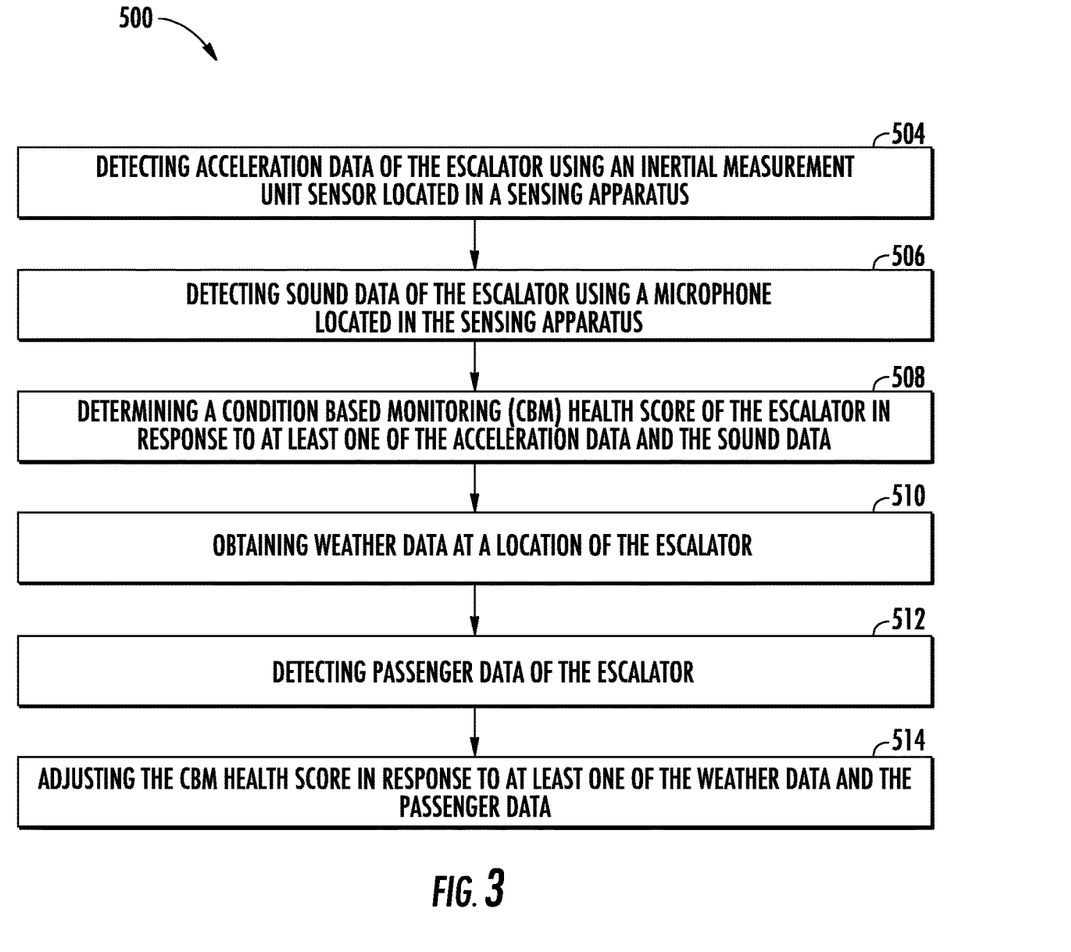
FIG. 3 is a flow chart of a method of monitoring an escalator, in accordance with an embodiment of the disclosure.

Referring now to FIG. 3, while referencing components of FIGS. 1-2. FIG. 3 shows a flow chart of a method 500 of monitoring an escalator, in accordance with an embodiment of the disclosure. In an embodiment, the method 500 may be performed by at least one of the sensing apparatus 210, the local gateway device 240, the application 440, and the analytic engine 280.

At block 504, acceleration data 312 of an escalator 10 is detected using an IMU sensor 218 located in a sensing apparatus 210. In one embodiment, the sensing apparatus 210 is located within a handrail 24 of the escalator 10 and moves with the handrail 24. In another embodiment, the sensing apparatus 210 is attached to a step chain 20 of the escalator 10 and moves with the step chain 20. In another embodiment, the sensing apparatus 210 is attached to a tread plate 18 of the escalator 10 and moves with the tread plate 18. In another embodiment, the sensing apparatus 210 is stationary and located proximate to a step chain 20 of the escalator 10 or a drive machine 26 of the escalator 10. At block 506, sound data 316 of the escalator 10 is detected using a microphone 230 located in the sensing apparatus 210.

At block 508, a CBM health score 318 is determined in response to at least one of the acceleration data 312 and the sound data 316. Alternatively, the CBM health score 318 may be determined in response to at least the acceleration data 312. At block 510, weather data 710 at a location of the escalator 10 is obtained. The weather data 710 may be obtained from the weather data source 700. At block 512, passenger data 810 of the escalator 10 is detected by the passenger detection engine 800. The passenger detection engine 800 may comprise at least one of a camera 822, a light curtain 824, and a load sensor 826.

At block 514, the CBM health score 318 is adjusted in response to at least one of weather data 710 and the passenger data 810. A maintenance schedule 850 may also be adjusted in response to at least one of the weather data 710 and passenger data 810. The maintenance schedule 850 may be adjusted directly or indirectly by the at least one of the weather data 710 and passenger data 810. For example, the maintenance schedule 850 may be adjusted indirectly by the at least one of the weather data 710 and passenger data 810 because the CBM health score 318 was directly adjusted by at least one of the weather data 710 and passenger data 810. Thus, a changed in the CBM health score 318 may adjust the maintenance schedule 850 of the escalator 10 down the road. The method 500 may also comprise that the operation of the escalator is adjusted in response to at least one of the weather data 710 and the passenger data 810. For example, the operation of the escalator 10 may be slowed during extreme heat or shut down during or in advance of flooding.

The method 500 may further comprise that a CBM health score 318 of the escalator 10 is determined in response to at least one of the acceleration data 312 and the sound data 316. In one embodiment, the sensing apparatus 210 is configured to determine the CBM health score 318 of the escalator 10 in response to at least one of the acceleration data 312 and the sound data 316.

In another embodiment, the acceleration data 312 and the sound data 316 is transmitted to a local gateway device 240 in wireless communication with the sensing apparatus 210 through a short-range wireless protocol 203 and the local gateway device 240 is configured to determine the CBM health score 318 of the escalator 10 in response to at least one of the acceleration data 312 and the sound data 316.

In another embodiment, the acceleration data 312 and the sound data 316 is transmitted to a local gateway device 240 in wireless communication with the sensing apparatus 210 through a short-range wireless protocol 203 and the local gateway device 240 transmits the acceleration data 312 and the sound data 316 to an analytic engine 280 through a cloud computing network 250. The analytic engine 280 is configured to determine the CBM health score 318 of the escalator 10 in response to at least one of the acceleration data 312 and the sound data 316.

In an embodiment, low frequency vibrations less than 10 Hz are detected using the IMU sensor 218. In another embodiment high frequency vibrations greater than 10 Hz are using the microphone 230. In another embodiment, high frequency vibrations are between 10 Hz and 1 kHz. In another embodiment, high frequency vibrations are greater than 1 kHz.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media (e.g., non-transitory computer readable medium), such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A monitoring system for an escalator, the monitoring system comprising:
    a local gateway device;
    an analytic engine in communication with the local gateway device through a cloud computing network;
    a passenger detection engine in communication with the analytic engine through a cloud computing network, the passenger detection engine being configured to determine passenger data of the escalator; and
    a sensing apparatus in wireless communication with the local gateway device through a short-range wireless protocol, the sensing apparatus comprising:
        an inertial measurement unit sensor configured to detect acceleration data of the escalator,
        wherein at least one of the sensing apparatus, the local gateway device, and the analytic engine is configured to determine a condition based monitoring (CBM) health Score of the escalator in response to at least the acceleration data,
    wherein the analytic engine is configured to adjust the CBM health score in response to at least the passenger data.

2. The monitoring system of claim 1, further comprising:
    a microphone configured to detect sound data of the escalator,
    wherein the CBM health score is determined in response to at least one of the acceleration data and the sound data.

3. The monitoring system of claim 1, wherein the analytic engine is configured to adjust a maintenance schedule of the escalator in response to the passenger data.

4. The monitoring system of claim 1, wherein the passenger detection engine comprises at least one of a camera, a light curtain, a load sensor, and an online database.

5. The monitoring system of claim 2, wherein the sensing apparatus is configured to determine the CBM health Score of the escalator in response to at least one of the acceleration data and the sound data.

6. The monitoring system of claim 2, wherein the sensing apparatus is configured to transmit the acceleration data and the sound data to the local gateway device and the local gateway device is configured to determine the CBM health Score of the escalator in response to at least one of the acceleration data and the sound data.

7. The monitoring system of claim 2, wherein the sensing apparatus is configured to transmit the acceleration data and the sound data to the analytic engine through the local gateway device and the cloud computing network, and wherein the analytic engine is configured to determine the CBM health Score of the escalator in response to at least one of the acceleration data and the sound data.

8. The monitoring system of claim 1, wherein the sensing apparatus is located within a handrail of the escalator and moves with the handrail.

9. The monitoring system of claim 1, wherein the sensing apparatus is attached to a step chain of the escalator and moves with the step chain.

10. The monitoring system of claim 1, wherein the sensing apparatus is stationary and located proximate to a step chain of the escalator or a drive machine of the escalator.

11. The monitoring system of claim 1, wherein the sensing apparatus is attached to a moving component of a drive machine of the escalator.

12. The monitoring system of claim 11, wherein the moving component of the drive machine is an output sheave that drives a step chain of the escalator.

13. The monitoring system of claim 2, wherein the sensing apparatus uses at least one of the inertial measurement unit sensor to detect low frequency vibrations less than 10 Hz and the microphone to detect high frequency vibrations greater than 10 Hz.

14. A monitoring system for an escalator, the monitoring system comprising:
    a local gateway device;

an analytic engine in communication with the local gateway device through a cloud computing network;

a weather data source in communication with the analytic engine through the cloud computing network, the weather data source being configured to obtain weather data at a location of the escalator; and a sensing apparatus in wireless communication with the local gateway device through a short-range wireless protocol, the sensing apparatus comprising:
  an inertial measurement unit sensor configured to detect acceleration data of the escalator,
  wherein at least one of the sensing apparatus, the local gateway device, and the analytic engine is configured to determine a condition based monitoring (CBM) health Score of the escalator in response to at least the acceleration data, wherein the analytic engine is configured to adjust the CBM health score in response to at least the weather data.

15. The system of claim 14, further comprising:
a microphone configured to detect sound data of the escalator,
wherein the CBM health score is determined in response to at least one of the acceleration data and the sound data.

16. The monitoring system of claim 14, wherein the analytic engine is configured to adjust a maintenance schedule of the escalator in response to the weather data.

17. The monitoring system of claim 15, wherein the sensing apparatus is configured to determine the CBM health Score of the escalator in response to at least one of the acceleration data and the sound data.

18. The monitoring system of claim 15, wherein the sensing apparatus is configured to transmit the acceleration data and the sound data to the local gateway device and the local gateway device is configured to determine the CBM health Score of the escalator in response to at least one of the acceleration data and the sound data.

19. The monitoring system of claim 15, wherein the sensing apparatus is configured to transmit the acceleration data and the sound data to the analytic engine through the local gateway device and the cloud computing network, and wherein the analytic engine is configured to determine the CBM health Score of the escalator in response to at least one of the acceleration data and the sound data.

20. A method of monitoring an escalator, the method comprising:
  detecting acceleration data of the escalator using an inertial measurement unit sensor located in a sensing apparatus;
  determining a condition based monitoring (CBM) health Score of the escalator in response to at least the acceleration data;
  obtaining weather data at a location of the escalator;
  detecting passenger data of the escalator; and
  adjusting the CBM health score in response to at least one of the weather data and the passenger data.

* * * * *